United States Patent [19]

Curtis et al.

[11] 3,740,596

[45] June 19, 1973

[54] LIQUID COOLED ROTOR FOR DYNAMOELECTRIC MACHINES

[75] Inventors: Little P. Curtis, Murrysville; Sui-Chun Ying, Monroeville; George F. Dailey, Pittsburgh, all of Pa.

[73] Assignee: Westinghouse Electric Corporation, Pittsburgh, Pa.

[22] Filed: Sept. 21, 1971

[21] Appl. No.: 182,368

[52] U.S. Cl. .................................... 310/54, 310/61

[51] Int. Cl. ............................................ H02k 9/20

[58] Field of Search .................. 310/54, 53, 58, 59, 310/61, 64; 417/435

[56] References Cited

UNITED STATES PATENTS

| | | | |
|---|---|---|---|
| 3,097,317 | 7/1963 | Fechheimer | 310/54 |
| 2,527,878 | 10/1950 | Fechheimer | 310/54 |
| 3,476,961 | 11/1969 | Heard | 310/58 |
| 3,145,314 | 8/1964 | Becker | 310/61 |
| 3,131,321 | 4/1964 | Gibbs | 310/64 |

*Primary Examiner*—R. Skudy
*Attorney*—A. T. Stratton and F. P. Lyle

[57] ABSTRACT

A liquid cooled rotor for dynamoelectric machines in which a coolant liquid such as water circulates through passages in the rotor and is discharged through an axial bore and radial passages in the rotor shaft, and in which flow restricting arrangement are provided in the radial passages for controlling the flow of liquid due to the self-pumping action of the radial passages and for improving the pumping action, the flow restricting arrangement having a curved and convergent orifice which changes the direction of the discharged liquid from radial to a direction approaching the tangential and opposite to the direction of rotation of the rotor.

6 Claims, 3 Drawing Figures

LIQUID COOLED ROTOR FOR DYNAMOELECTRIC MACHINES

BACKGROUND OF THE INVENTION

The present invention relates generally to the cooling of dynamoelectric machines, and more particularly to a liquid cooled rotor for machines of large size such as turbine generators.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system, and has made it possible to greatly increase the maximum ratings obtainable in large generators without exceeding the permissible limits of physical size. The coolant used in these machines has usually been hydrogen, which fills the gas-tight housing and is circulated by a blower on the rotor shaft through the ducts of the stator and rotor windings and through ducts in the stator core.

The maximum ratings required in large generators have continued to increase, however, making it necessary to further improve the cooling of these machines in the largest sizes. A substantial improvement in cooling can be obtained by the use of more efficient coolant fluids such as liquids. This has been done in stators by circulating a liquid coolant such as water through the ducts of the stator winding, and a considerable improvement in cooling has thus been obtained. A substantial further improvement can be obtained by applying liquid cooling to the rotor by circulation of a suitable liquid such as water through passages in the rotor windings.

Many problems are involved, however, in circulating a liquid coolant through the rotor of a large generator. In one desirable type of construction, the water or other coolant liquid is introduced into the rotor along the axis of the shaft at one end and flows through an axial passage and radial passages to an annular distribution chamber on the surface of the rotor, from which the liquid is distributed to individual conductors of the rotor winding. The liquid flows through passages in the winding conductors and at the other end flows to an annular collecting chamber on the rotor surface. The liquid is discharged from the collecting chamber through radial passages to an axial bore at the center of the shaft, and flows axially through the bore to another set of radial passages through which it is discharged from the rotor to a stationary discharge chamber.

The radial discharge passages act as a centrifugal pump, and provide a strong self-pumping action. The minimum diameter of these passages is determined primarily by the necessity for access to their radially inner ends for welding stainless steel liners to a stainless steel liner in the shaft bore with which the passages communicate. This requirement sets a minimum diameter sufficiently large to make it necessary to restrict the flow of water through the radial passages, both to control the flow rate through the rotor due to the self-pumping action and to maintain a static pressure high enough to prevent cavitation. It has been proposed to restrict the flow of liquid in rotors of this type by means of simple orifices disposed in the radial passages, as in Fechheimer U.S. Pat. No. 2,527,878 and Heard et al. U.S. Pat. No. 3,398,304. It has been found by test, however, that such orifices do not give satisfactory results, and severe vibration of the stationary discharge chamber can also occur because of the large impact forces of the high velocity flow from the rotor passages.

SUMMARY OF THE INVENTION

In accordance with the present invention, improved means are provided for restricting the flow of liquid through the radial discharge passages of a liquid cooled rotor of the general type described above. More specifically, each of the radial passages is closed by a plug member secured in the outer end of the passage adjacent the surface of the rotor, and the plug member has a discharge opening or orifice extending through it for flow of liquid discharged through the radial passage. The orifice restricts the flow of liquid and changes its direction, being substantially radial at the inner or entrance end, and changing to a more nearly tangential direction at the outer or discharge end, so that the liquid is discharged in a direction approaching the tangential and opposite to the direction of rotation of the rotor. The orifice decreases in diameter from the inner end to the outer end so as to gradually converge towards the discharge end to restrict the flow through the orifice. The change in direction of the liquid discharged from the rotor has a very important effect on the pumping action, and increases the hydraulic efficiency so that the pumping power required for a given flow rate is greatly decreased. The change in direction of flow from radial to a more nearly tangential direction opposite to the direction of rotation also eliminates the problem of vibration of the discharge chamber. The gradually converging discharge channel minimizes losses in the flow through the orifice and thus further contributes to the overall efficiency of the design.

BRIEF DESCRIPTION OF THE DRAWINGS

The invention will be more fully understood from the following detailed description of an illustrative embodiment, taken in connection with the accompanying drawings, in which.

DESCRIPTION OF THE PREFERRED EMBODIMENT

Figure 1:
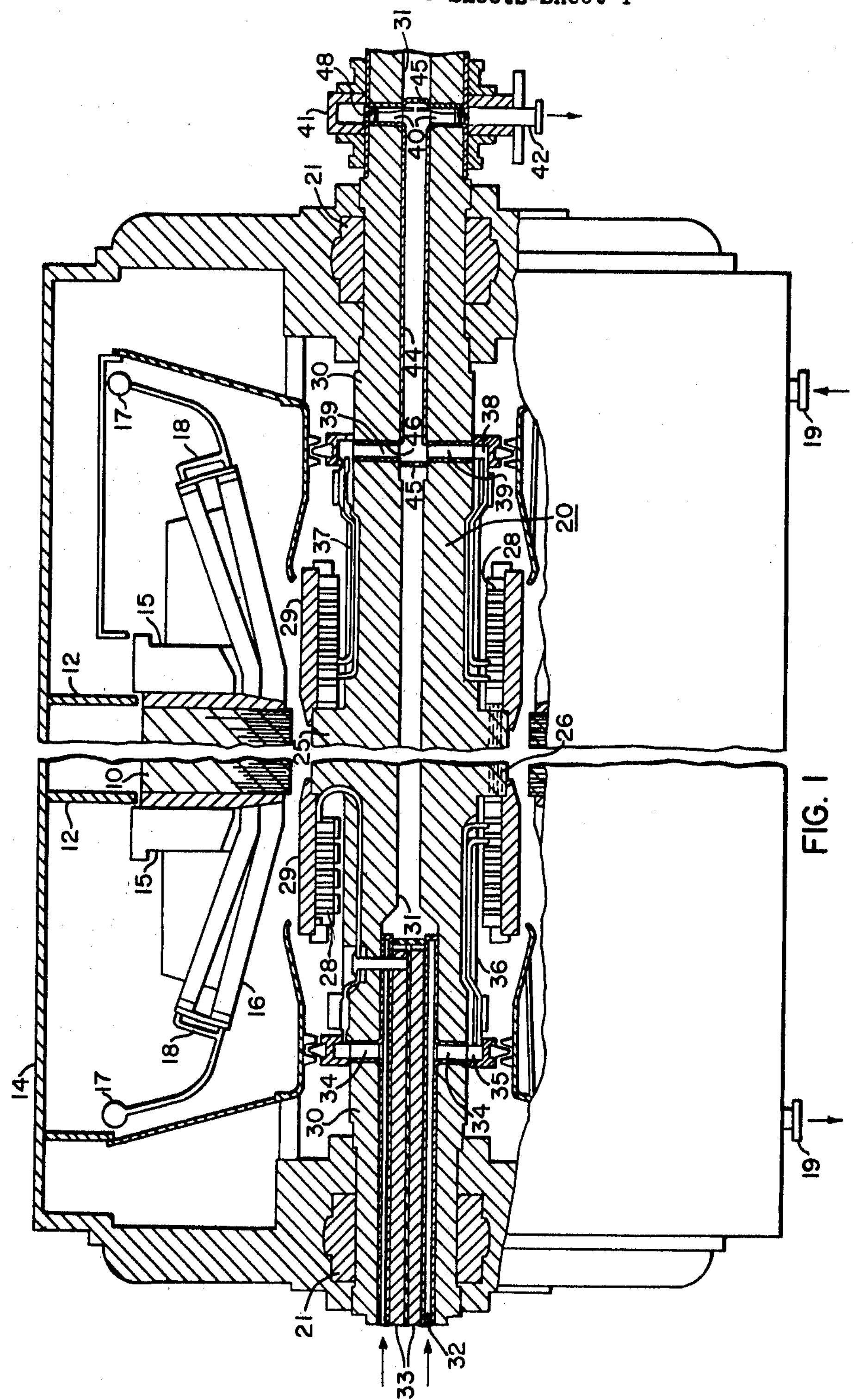
FIG. 1 is a view in longitudinal section and partly in elevation of a turbine generator, having a liquid cooled rotor embodying the invention.

Referring first to FIG. 1 of the drawing, the invention is shown embodied in the rotor of a large turbine generator of typical construction, although it will be understood that the rotor of the present invention may be used in machines of any desired type. As shown, the generator has a stator core 10, supported by frame rings 12 in a substantially gas-tight outer housing 14. The stator core 10 is of the usual laminated construction, having a generally cylindrical bore therethrough, and the laminations are clamped between suitable end plates 15 in the usual manner. The stator core 10 has longitudinal slots in its inner periphery for the reception of a stator winding 16, which may be of any suitable type but which is shown as a liquid cooled winding.

For this purpose, circular inlet and discharge manifolds 17 are provided at opposite ends of the machine and connected through suitable means, generally indicated at 18, to circulate a coolant liquid such as water through the coils of the stator winding 16. The manifolds 17 may be connected as indicated diagramatically at 19 to an external recirculating system of any desired type. The housing 14 is filled with a coolant gas, preferably hydrogen, which is circulated through the interior of the housing to cool the stator core by flowing through cooling ducts, and suitable baffling of any desired type may be provided in the housing to direct the flow of gas therein.

The machine has a rotor member 20, which is disposed in the bore of the stator core 10 and supported in bearings 21 in the ends of the housing 14. The bearing assemblies preferably include gland seals to prevent leakage of gas along the rotor shaft, and may be of any suitable or usual construction but have not been illustrated in detail as they are not a part of the invention. The rotor member 20 has a central body portion 25 which is provided with peripheral slots in the usual manner for the reception of a rotor winding 26. The winding 26, which constitutes the field winding of the generator, may be arranged in any suitable manner in the slots of the rotor to form the desired number of magnetic poles, usually either two or four in machines of this type. The winding 26 is constituted of copper conductors which extend longitudinally through the slots of the rotor body 25 and generally circumferentially in the end turn portions 28, which lie beyond the ends of the body portion 25 and are supported against rotational forces by the usual heavy retaining rings 29. The conductors of the rotor winding are hollow or have central passages extending through them for flow of coolant liquid from one end of the winding to the other. Any suitable or desired type of flow pattern may be utilized, and any desired type of electrical circuit may be used.

The rotor 20 shown in the drawing is a liquid cooled rotor of the construction more fully disclosed and claimed in a copending application of L. P. Curtis et al., Ser. No. 144,050, filed May 17, 1971 and assigned to the assignee of the present invention. The rotor 20 has shaft portions 30 extending axially from each end of the body portion 25 and preferably integral therewith. The rotor has a central axial bore 31 which, in accordance with usual practice, may extend for the entire length of the rotor from one end to the other. As more fully described in the above-mentioned copending application, a coolant liquid, preferably water, is introduced through the shaft portion 30 at the left-hand end, as viewed in the drawing, and flows through an annular passage 32 in the bore 31. The passage 32 is preferably formed by two concentric stainless steel tubes and surrounds axial electrical leads 33, which provide electrical connection to the rotor winding 26. The water flows through the passage 32 to opposed radial passages 34, which extend to an annular distribution chamber 35 on the surface of the rotor shaft 30. Water is distributed from the annular chamber 35 by means of hydraulic connectors 36 of any suitable type to the individual conductors of the rotor winding, the connections being made to the end turns 28.

The water flows through the hollow conductors of the rotor winding to the other end, and is discharged through similar connectors 37 to an annular collecting chamber 38 on the shaft 30 at the right-hand end of the rotor. The water flows from the chamber 38 through two opposed radial passages 39 to the bore 31 of the shaft and axially through the bore 31 to opposed radial passages 40 which extend to the surface of the rotor shaft 30. The water is discharged through these passages 40 into a stationary discharge chamber 41 which is provided with suitable seals to prevent escape of the water, and the water is discharged through a drain 42, preferably to be treated and recirculated in a closed system.

All passages and surfaces exposed to the coolant are preferably lined or covered with stainless steel, or other corrosion resistant material, to prevent corrosion of the rotor steel by the heated coolant water. In particular, at the discharge end of the rotor, the axial bore 31 is lined with a stainless steel tubular liner 44, which extends between the two sets of radial passages 39 and 40 and which is closed at each end by a plate or plug 45 of any suitable type welded or otherwise secured in the ends of the liner 44 with a liquid-tight joint. The passages 39 and 40 are similarly lined with tubular stainless steel liners 46 welded or otherwise sealed to the tubular liner 44 of the shaft bore. Any other suitable corrosion resistant material might of course be utilized instead of stainless steel if desired.

As previously discussed, the opposed radial discharge passages 40 function as a centrifugal pump and provide a strong self-pumping action on the water flowing through the rotor. The necessity of obtaining access to the inner end of the passages 40 for welding the liners 46 to the bore liner 44 sets a minimum diameter for the passages 40 which is sufficiently large to make it necessary to restrict the flow of liquid through the passages 40. This restriction is necessary to control the water flow to a desired flow rate and also to maintain the pressure in the passages above the cavitation pressure. It is necessary therefore to provide flow restricting means in the passages 40. Simple orifice plates might be utilized for this purpose, but it has been found by test that such plates are not satisfactory as they greatly reduce the efficiency of the pumping action and also cause severe vibration of the stationary discharge chamber 41 because of the large impact forces resulting from the large velocity components of the radial discharge.

In accordance with the present invention, a flow restrictor is provided in each passage which has a curved discharge channel or orifice therethrough which changes the direction of the water from radial to a direction approaching tangential in the direction opposite to the direction of rotation of the rotor. The discharge channel is of gradually reducing diameter from the entrance end to the discharge end to provide a converging flow channel for smooth transition and restriction of flow with minimum loss. In the preferred embodiment shown in the drawing the flow restrictor consists of a plug 48 of stainless steel or other corrosion resistant material threaded in each of the passages 40 at the outer end adjacent the surface of the rotor shaft 30. Each plug 48 has an orifice or discharge channel 49 extending through it for discharge of water flowing in the radial passage 40. As clearly shown in FIG. 3, the discharge orifice 49 is generally radial at the inner or entrance end but is curved to change direction as it passes through the plug 48 so that its outer or discharge end 50 discharges the liquid in a direction which approaches the tangential, and which is opposite to the direction of rotation of the rotor indicated by the arrow in FIG. 3. It will also be seen that the discharge channel 49 is of relatively large diameter at its entrance end and gradually decreased in diameter, or cross sectional area, towards the discharge end, so as to provide a gradually converging water channel leading to a relatively small discharge opening 50. If desired, a vent tube 51 for venting air or other gas from the region of the rotor axis may also extend through the plug 48, and is preferably attached to a support member 52 secured to the plug 48, as more fully disclosed and claimed in a copending application of P.R. Heller et al., Ser. No. 182,367, filed Sept. 21, 1971, and assigned to the assignee of the present invention.

Figure 2:
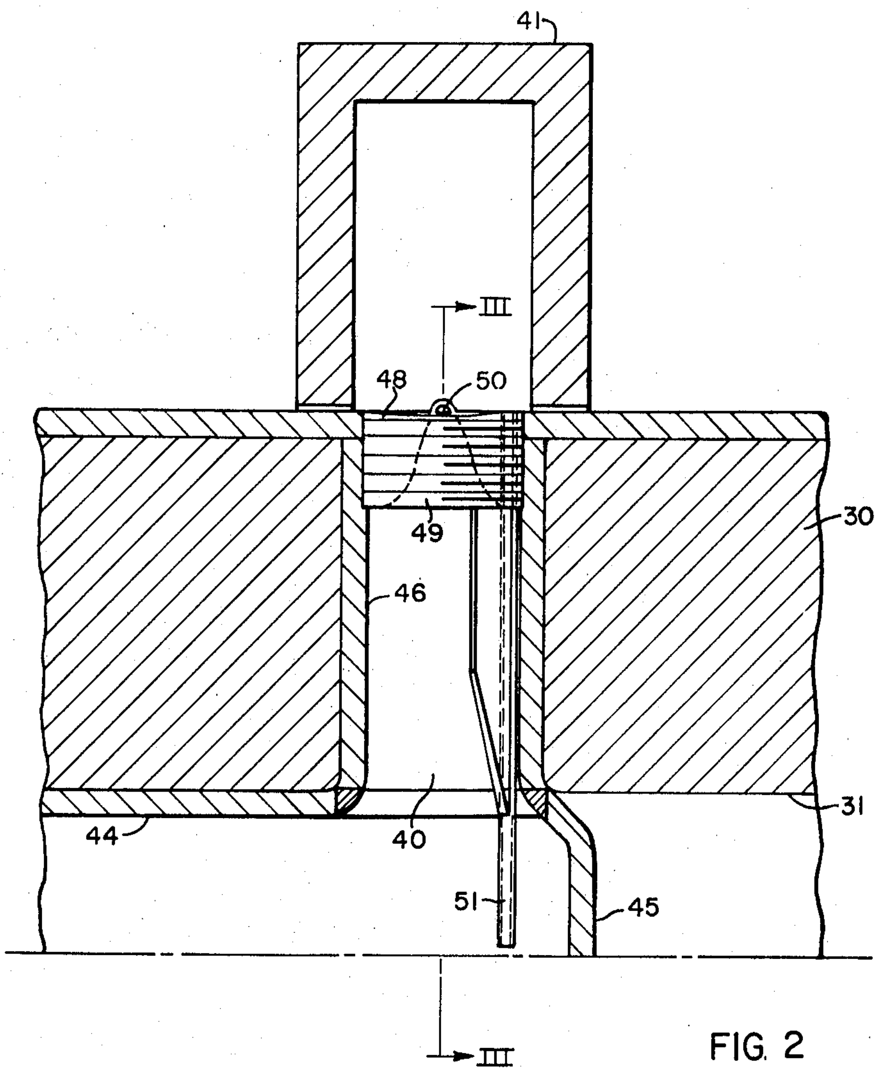
FIG. 2 is a fragmentary longitudinal sectional view at the discharge end of the rotor shaft showing one of the discharge passages.
Figure 3:
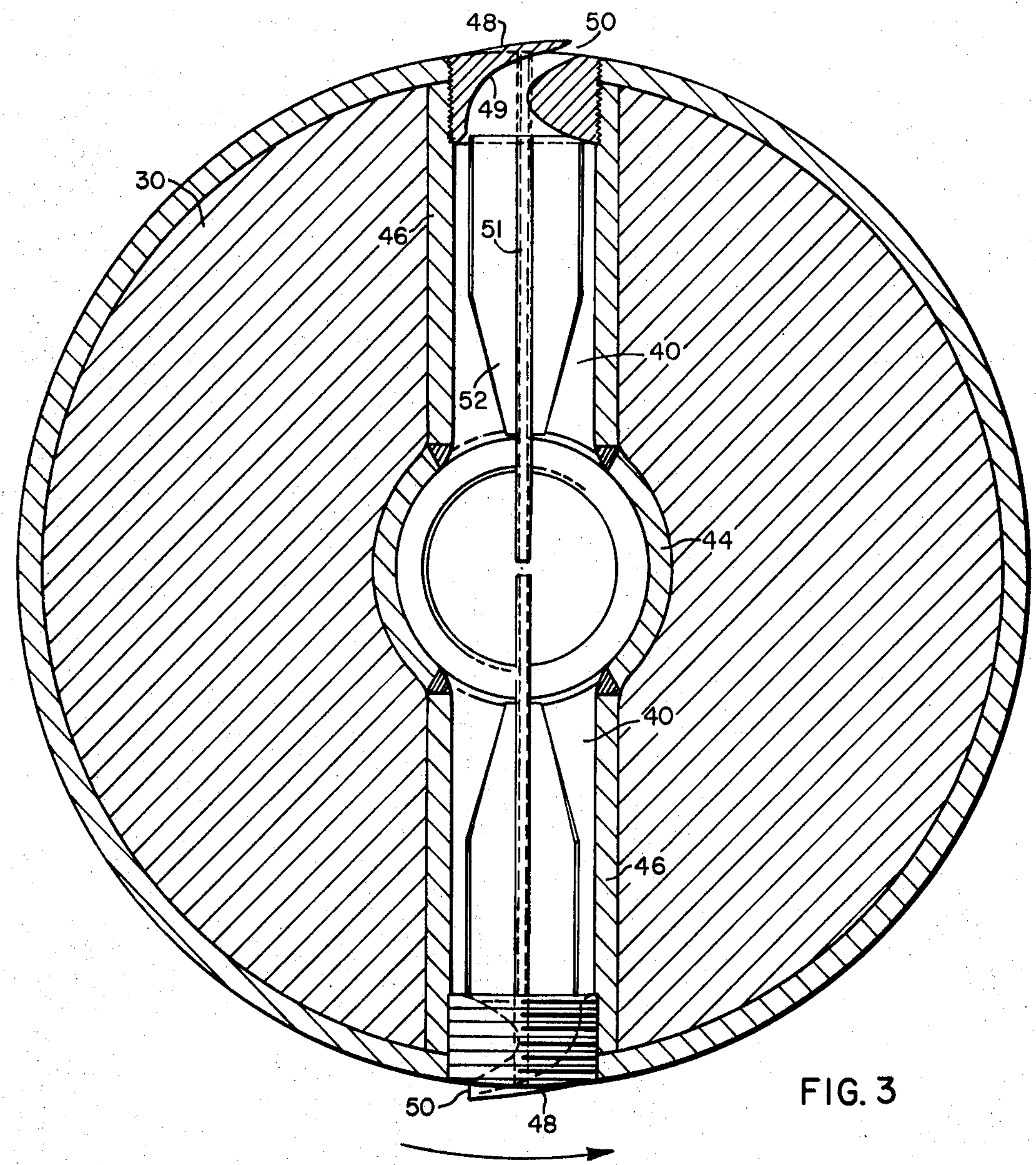
FIG. 3 is a fragmentary transverse sectional view substantially on the line III—III of FIG. 2, but showing the full rotor shaft.

The curved and convergent discharge orifice 49 provides greatly improved results, as compared to a simple orifice plate. As previously stated, if the water is discharged radially from the rotor, through a discharge orifice or otherwise, the pumping power required is high and excessive vibration occurs in the stationary discharge chamber 41 into which the water is discharged. It has been found that as the direction of discharge of the water changes from the radial direction to a direction approaching the tangential, the power required for pumping changes correspondingly and is greatly reduced. That is, the pumping power varies markedly with the discharge angle of the water, which may be defined as the angle between the direction of the discharged water relative to the rotor and a tangent to the surface of the rotor at the point of discharge. For example, it has been found by test that when the discharge angle is decreased from 90°, which would be radial, to a small angle such as shown in FIG. 3, the pumping torque required is decreased by about 75 percent. In one particular embodiment, involving a 21 inch diameter shaft with radial passages 40 having a length of 10.5 inches and with a flow of 400 gallons per minute of water at 3,600 rpm, the pumping power required was decreased by about 200 KW as the discharge angle of the water was changed from substantially radial to the angle shown in FIG. 3. It will be obvious that this is a very significant improvement. The gradually convergent discharge channel 49 is also important to the improved performance since the gradual convergence effects the desired restriction of flow with minimum friction and eddy losses. The gradually reducing area of the curved flow channel 49, as illustrated in FIGS. 2 and 3, results in a transition of the flow from radial to a nearly tangential direction, and in the desired restriction of flow, with a smooth conversion of pressure head to velocity with relatively small losses, so that the overall efficiency is further improved by this action. Furthermore, the change in direction of the discharged water and the reduction in the absolute velocity, as compared to a radial discharge, results in the complete elimination of any vibration of the discharge chamber 41.

It will now be apparent that a flow restrictor has been provided for a liquid cooled rotor which is very effective in controlling the flow of liquid through radial discharge passages in a manner which greatly improves the hydraulic efficiency of the structure, and which minimizes losses in the flow channel, as well as eliminating any vibration problem in the stationary discharge chamber. A particular embodiment of the invention has been shown and described for the purpose of illustration, but it will be apparent that other embodiments and modifications are possible, and all such embodiments are within the scope of the invention.

We claim:

1. In a rotor member for a dynamoelectric machine, said rotor member having passages for circulation of a liquid coolant therethrough, said passages including an axial passage and opposed radial passages communicating with the axial passage and extending to the surface of the rotor for discharging liquid therefrom, and means in each of said radial passages for restricting the flow of liquid therethrough and discharging the liquid in a non-radial direction approaching the tangential and opposite to the direction of rotation of the rotor.

2. The combination defined in claim 1 in which the restricting means has a curved discharge passage which converges in size toward the discharge exit.

3. The combination defined in claim 1 in which said flow restricting means comprises a plug member secured in each radial passage adjacent the surface of the rotor, each plug member having an orifice extending therethrough adapted to restrict the flow of liquid and to change its direction.

4. The combination defined in claim 3 in which said orifice is a curved passage which changes direction from substantially radial at the entrance to a direction approaching the tangential at the discharge exit.

5. The combination defined in claim 3 in which said orifice converges in area toward the discharge exit.

6. The combination defined in claim 4 in which said orifice decreases in diameter from the entrance end to the discharge exit.

* * * * *